Patented May 29, 1951

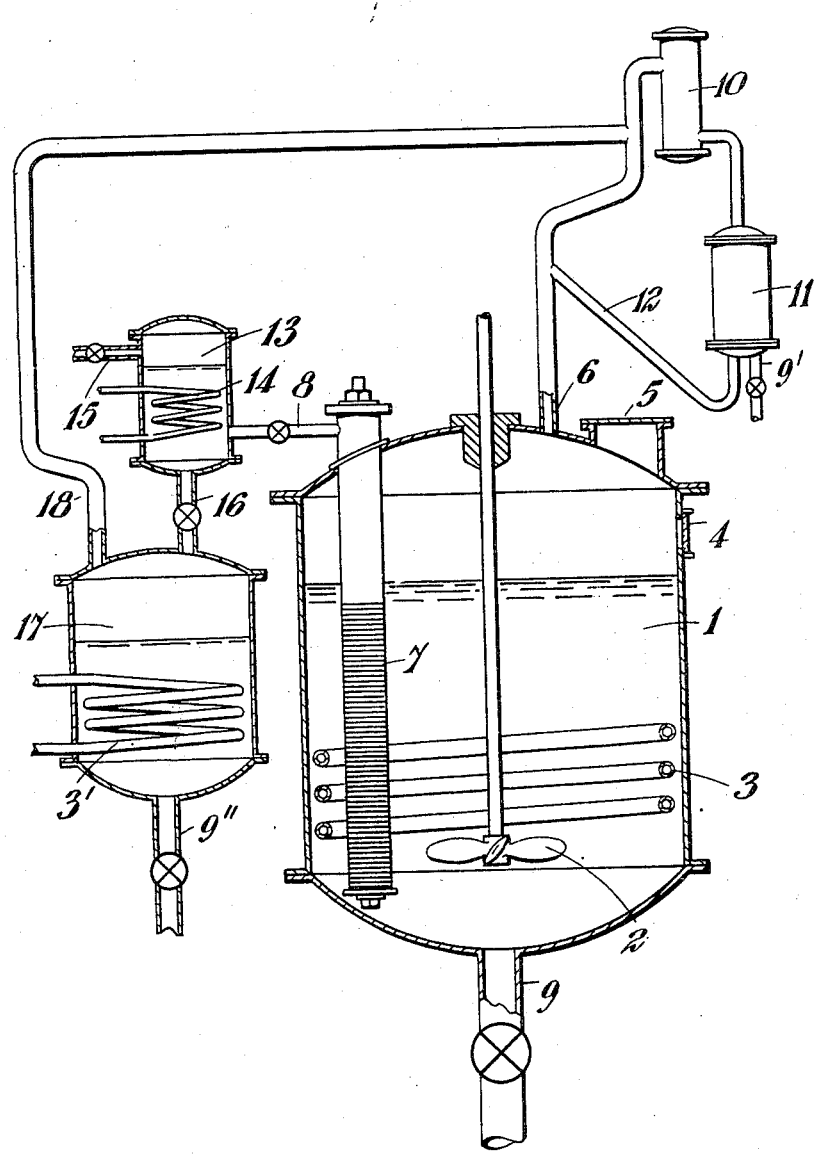

2,554,750

UNITED STATES PATENT OFFICE 2,554,750

PREPARATION OF ZEIN

Solomon Harris Pinner, London, and Alan Douglas Whitehead, Ardleigh, England, assignors to BX Plastics Limited, London, England, a company of Great Britain Application August 30, 1948, Serial No. 46,824
In Great Britain September 2, 1947

10 Claims. (Cl. 260—123)

The object of this invention is the extraction of zein from maize gluten in a form conducive to further operations leading to zein in the state of high purity and substantial freedom from colour, so as to be particularly suitable for refined uses in the plastic industry and especially for the manufacture of transparent water-white plastics.

The subsequent operations of purification may be in accordance with our co-pending application No. 34,344 filed June 21, 1948, now abandoned, in the names of Dorothy Sybil Starling, Solomon Harris Pinner, and Alan Douglas Whitehead, but the process of the present invention has inherent advantages so that the invention is not limited to any particular subsequent treatment of the extracted product.

Zein as commonly extracted from maize gluten is highly coloured. The colour is due to the presence of associated impurities such as fats, oils and natural plant pigments. Various methods have been proposed to remove these impurities from zein. These methods fall into two classes, involving the extraction of maize gluten on the one hand, and the counter-current extraction of alcoholic solutions of zein on the other. In all cases hydrocarbons, such as benzene, toluene and hexane, have been used for the purpose of extraction.

In the case of the extraction of maize gluten it has first been necessary to remove the water from the gluten by drying, before treatment with the water-immiscible hydrocarbon. This process of drying converts the gluten into hard granules which are then resistant to the penetration of the hydrocarbon, and it is, consequently, difficult to remove all the impurities in this manner.

In order to overcome these difficulties, it has been considered necessary to dissolve the zein prior to extraction.

Thus it has been proposed to isolate the zein first from the maize gluten by extraction with an alcoholic solvent, then to dry the zein and finally extract the impurities from the zein by means of a hydrocarbon solvent. This procedure has very little advantage over the extraction of maize gluten for the same reasons.

According to another proposal an aqueous alcoholic solution of zein is treated with water-free alcohol until the water content of the solution is low enough to allow the zein to precipitate out and leave the oils, fats and pigments still dissolved in the alcohol. Alternatively, an immiscible liquid is added to the zein solution, which likewise brings about the precipitation of the zein, whilst allowing the impurities to remain dissolved in the main solvent. Other proposals have been made for extracting the impurities from the solution without precipitating the zein at the same time.

According to the present invention maize gluten, or crude zein still containing its associated impurities, is subjected to a treatment with a chlorinated hydrocarbon at an elevated temperature whereby the major portion of the impurities is dissolved out. Trichlorethylene or perchlorethylene is the preferred solvent and it is preferred to work at the boiling temperature under reflux.

It is unnecessary to dry the gluten or other crude product before extraction. The effectiveness of the process depends on the fact that the moist zein particles are susceptible to penetration by the chlorinated hydrocarbon, enabling the oil and fats to be removed with relative ease.

The water may be removed from the zein concurrently with the treatment with the chlorinated hydrocarbon so that a final product is obtained which is not only substantially free of oils, fats and pigments, but is also dry.

The process may be applied to maize gluten in various stages of manufacture, i. e. to maize gluten in the form of a weak suspension in water or in a form substantially free of water, or to crude zein itself, but since the main object of this process is to remove oils and fats it is preferably applied to maize gluten from which substantially all the starch has been removed, and containing 10 to 50 parts by weight of water per 100 parts of gluten.

The process may be carried out so that the impurities dissolved in chlorinated hydrocarbon are continuously removed from the treatment zone through a filter.

Substantially pure zein may then be extracted from the maize gluten or crude zein, thus purified, by treatment of the purified product with aqueous alcohol or other zein solvent, such that the zein will be dissolved leaving the gluten in the solid state.

The apparatus for carrying out the process according to the invention may take many forms. A suitable installation is hereinafter described with reference to the accompanying drawing.

A closed treatment vessel 1 is equipped with stirring means 2, a steam heating coil 3, a sight glass 4, an inspection port 5, a vapour outlet pipe 6 and a streamlined filter 7 leading to a solution outlet pipe 8 and a vessel emptying valve 9. The vapour outlet pipe 6 connects to a condenser 10 which in turn connects to a separator 11 fitted with an emptying valve 9', and a pipe 12 leads back to the vapour outlet pipe 6 from said separator 11. The solution outlet pipe 8 connects to a container 13 fitted with a cooling coil 14, and a pressure control pipe 15. A valved pipe 16 connects the container 13 to a distillation vessel 17 fitted with a steam heating coil 3', a vessel emptying valve 9'' and a vapour outlet pipe 18 leading to the pipe 6 and thence to the condenser 10.

The treatment vessel 1 is suitably constructed of stainless steel or other material protected if need be by a suitable protective lining or surface coating. If the container 13 is fitted above the level of the solution in the treatment vessel 1, as shown in the drawing, it is suitable to maintain a lower pressure in the former to ensure a flow of solution from the latter to the said container and thence, under gravity, into the distillation vessel. Under these conditions it will be necessary to cool the hot solution on entering the container to prevent vaporisation thereof under the reduced pressure. This container, however, is by no means essential and may well be eliminated if suitable means are provided for transferring the hot solution from the treatment vessel 1 direct to the distillation vessel 17.

The following example illustrates the effecting of the process according to the invention in such apparatus as has been described above:

*Example*

400 lbs. of maize gluten consisting of approximately 30% zein, 30% globulin and glutelin, 20% moisture, 10% oils and fats, 2.5% ash, 2.5% fibre, and 5% starch and dextrins, are charged into the treatment vessel 1. To this vessel are then added 100 gallons of trichlorethylene. The stirrer 2 is started and sufficient heat is applied by means of steam passed through the heating coil 3 to cause the trichlorethylene to boil. The combined operations of water and impurities-removal then takes place as follows:

The rising vapours of trichlorethylene and entrained water are condensed in the condenser 10 and the condensed trichlorethylene vapour is refluxed to the treatment vessel 1 via the separator 11.

At the same time a solution of the impurities in the trichlorethylene passes through the filter 7 and collects in the solution container 13. From time to time this solution is discharged into the distillation vessel 17, in which the trichlorethylene is separated from the impurities by distillation. These impurities, which consist largely of fats, oils and pigments, may be periodically discharged from the bottom of the distillation vessel 17 for subsequent processing. The distillate from this vessel is returned to the main treatment vessel 1 via the pipe 18 and the reflux system.

This process is continued for twelve hours, whereupon the water and a small quantity of trichlorethylene is drained from the separator 11 through the valve 9' which is then left open. The heating and filtering is continued, and the trichlorethylene condensate is run into a separate container, not shown in the drawing, via the open valve, until the maize gluten is substantially free of trichlorethylene. The solution container 13 and distillation vessel 17 are now drained of trichlorethylene through the valves 16 and 9'', and the oil-extracted gluten in the treatment vessel 1 is treated with 200 gallons of 90% alcohol. The temperature of the vessel 1 is raised to 60° C., and stirring is continued for 6 hours. The suspension of the gluten in the alcohol is then discharged from the vessel 1 and conducted to a high speed centrifuge, not shown in the drawing, wherein the residual gluten is separated from the solution of zein in alcohol. The gluten is subsequently steamed to remove residual alcohol and then passed into a dryer and is finally obtained in a very clean form suitable as a cattle feed.

The solution of zein in alcohol however, may then be treated with the decolourising processes described in our co-pending application No. 34,344 and the zein is finally obtained in a highly pure and colourless form suitable for fabrication into water-white transparent plastics.

This particular installation and example should not be construed as limiting the scope of the invention. A number of variations may be found convenient and may be introduced at various stages. Thus, for example, the filter means may comprise a false bottom with a supported filter cloth or alternatively it may be found desirable to dispense with an internal filter in the vessel 1 and to allow the solution of the impurities in the chlorinated hydrocarbon to drain away from the solid and be passed through a filter press to remove fine particles prior to transfer to the distillation vessel 17. This can readily be achieved by arresting the agitation temporarily and drawing off the chlorinated hydrocarbon from the port at the bottom of the vessel 1. Since the gluten is substantially lighter than the solvent, it will settle at the top and substantially complete separation will thereby be obtained. Other suitable means of decantation may be introduced. It may be further desired to introduce fresh solvent to the vessel 1 during the course of the extraction with the chlorinated hydrocarbon. This may be introduced continuously via the vapour pipe 6 or via a separate inlet or, alternatively, the extraction may be stopped, the solution drained away and fresh solvent added batchwise.

It may further be desirable to expedite the elimination of the chlorinated hydrocarbon from the oil-free gluten by blowing in live steam with or without the application of a vacuum.

Similarly, in the second stage, the gluten may be partially or wholly separated from the alcohol within the vessel 1 by making use of the same streamline filter 7, false bottom filter or other suitable filter, or alternatively, by suitable decantation means.

The alcohol-extracted gluten may be steamed to remove residual alcohol within the vessel 1 and may also be treated with further quantities of alcohol and the extraction repeated. Alternatively, the alcohol may be continuously distilled off from the solution of zein and likewise returned to the vessel 1.

Apart from the broad conditions of the extraction, the composition and type of solvent may vary widely. Suitable chlorinated solvents for example are—trichlorethylene, perchlorethylene, carbon tetrachloride, ethylene dichloride, acetylene tetrachloride, trichlorethane, propylene dichloride. Similarly in the second stage ethyl alcohol varying in composition from 50% aqueous alcohol to 95% aqueous alcohol may be used. Alternatively, other solvents such as methanol, aqueous isopropyl alcohol, aqueous acetone, a binary mixture consisting of any two of the following, an alcohol, a chlorinated hydrocarbon, an ether, an ester or water, or suitable ternary mixtures which are known to dissolve zein may be used.

The efficiency of the process depends closely on the conditions used, but these conditions may vary widely. For example, the extraction with chlorinated hydrocarbons may occupy from 30 mins. to 96 hours. It may also be carried out at temperatures from room temperature to 90° C. Likewise, the extraction with alcohol may be carried out at temperatures between room temperatures and 80° C. and may last for 10 mins. to 24 hours.

The solution arising from this extraction may be further purified as indicated. The zein may finally be isolated by the usual methods of drying such as roller drying, spray drying, flash drying and the like. It may then be used for the usual applications of zein, such as films, fibres, lacquers, coatings, but is particularly suited for the manufacture of plastics.

If for any purpose the oil-extracted gluten is required as such, the subsequent treatment with alcohol will be omitted.

What we claim is:

1. Process for the extraction of zein from maize gluten, characterized in that water-containing maize gluten is subjected to a treatment with a chlorinated hydrocarbon in liquid condition at above room temperature whereby the major portion of the impurities is dissolved out, and the purified maize gluten is then treated with a zein solvent to extract the zein.

2. Process for the extraction of zein from maize gluten, characterized in that water-containing maize gluten is subjected to a treatment with a chlorinated hydrocarbon in liquid condition at above room temperature whereby the major portion of the impurities is dissolved out, and the purified maize gluten is then treated with a zein solvent to dissolve the zein.

3. Process for the extraction of zein from maize gluten, characterized in that water-containing maize gluten is subjected to a treatment with an aliphatic chlorhydrocarbon in liquid condition at the boiling temperature of the latter whereby the major portion of the impurities is dissolved out, the treatment being effected under reflux and the water being removed concurrently with the impurities, and the purified and substantially dry maize gluten is then treated with a zein solvent to dissolve the zein.

4. Process for removing impurities from maize gluten, characterized in that the maize gluten containing 10–50 parts by weight of water per 100 parts by gluten, is subjected to a treatment with a chlorinated hydrocarbon in liquid condition at above room temperature whereby the major portion of the impurities is dissolved out, and the purified maize gluten is then treated with a zein solvent to extract the zein.

5. Process for the extraction of zein from maize gluten characterized in that water-containing maize gluten, substantially freed from starch, is subjected to a treatment with a chlorinated hydrocarbon in liquid condition at above room temperature whereby the major portion of the impurities is dissolved out, and the purified maize gluten is then treated with a zein solvent to extract the zein.

6. The method of claim 1 in which the zein solvent is an aqueous lower alkanol.

7. The method of claim 6, in which the chlorinated hydrocarbon is trichlorethylene.

8. The method of claim 1 in which chlorinated hydrocarbon is trichloroethylene.

9. The method of claim 8 in which the zein solvent is aqueous alcohol.

10. In a process for the extraction of zein from maize gluten, the step of subjecting water-containing maize gluten to treatment with a chlorinated hydrocarbon in liquid condition at above room temperature to dissolve out the major portion of the impurities and leave a purified maize gluten.

SOLOMON HARRIS PINNER.
ALAN DOUGLAS WHITEHEAD.

REFERENCES CITED

The following references are of record in the file of this patent:

UNITED STATES PATENTS

| Number | Name | Date |
| --- | --- | --- |
| 744,510 | Donard et al. | Nov. 17, 1903 |
| 1,880,816 | Cole | Oct. 4, 1932 |
| 2,044,769 | Buron et al. | June 23, 1936 |
| 2,120,946 | Swallen | June 14, 1938 |
| 2,260,111 | Caldwell | Oct. 21, 1941 |
| 2,229,870 | Pearce | Jan. 28, 1941 |
| 2,479,519 | Schopmeyer | Aug. 16, 1949 |